United States Patent
Rygas et al.

(10) Patent No.: US 6,833,395 B2
(45) Date of Patent: Dec. 21, 2004

(54) INTAGLIO PRINTING INKS HAVING IMPROVED DISPERSIBILITY AND CHEMICAL RESISTANCE

(75) Inventors: Ted P. Rygas, Kanata (CA); Laurence M. Suzzarini, Ottawa (CA); Christine A. Caputo, Nepean (CA); Sheila M. Palaisy, Cantley (CA)

(73) Assignee: Canadian Bank Note Company, Limited, Ottawa (CA)

( * ) Notice: Subject to any disclaimer, the term of this patent is extended or adjusted under 35 U.S.C. 154(b) by 0 days.

(21) Appl. No.: 09/970,940

(22) Filed: Oct. 5, 2001

(65) Prior Publication Data

US 2003/0100628 A1 May 29, 2003

Related U.S. Application Data

(63) Continuation-in-part of application No. 09/455,762, filed on Dec. 7, 1999, now abandoned.

(51) Int. Cl.$^7$ .......................... C09D 11/10; C08L 67/08; C08K 5/16; C08K 5/17
(52) U.S. Cl. ...................... 523/160; 524/186; 524/601
(58) Field of Search ................. 523/160, 161; 106/31.59, 31.89; 524/601, 186

(56) References Cited

U.S. PATENT DOCUMENTS

| | | | |
|---|---|---|---|
| 4,029,617 A | 6/1977 | Dhein | |
| 4,081,411 A | 3/1978 | Hunsucker | |
| 4,116,904 A | 9/1978 | Verma | |
| 4,179,417 A | 12/1979 | Sunada | |
| 4,197,135 A | 4/1980 | Bailey | |
| 4,238,234 A | 12/1980 | Lang | |
| 4,267,088 A | 5/1981 | Kempf | |
| 4,288,351 A | 9/1981 | Miller | |
| 4,385,901 A | 5/1983 | Podder | |
| 4,756,760 A | 7/1988 | Rudolph | |
| 4,764,215 A | 8/1988 | Rudolph | |
| 4,966,628 A | 10/1990 | Amon et al. | |
| 5,017,224 A | 5/1991 | Tomita | |
| 5,141,556 A | 8/1992 | Matrick | |
| RE34,389 E | 9/1993 | Amon et al. | |
| 5,244,496 A | 9/1993 | Easton | |
| 5,308,390 A * | 5/1994 | Pennaz | 524/313 |
| 5,364,462 A | 11/1994 | Crystal | |
| 5,498,283 A | 3/1996 | Yu | |
| 5,569,701 A | 10/1996 | Moynihan | |
| 5,725,647 A | 3/1998 | Carlson | |
| 5,730,789 A | 3/1998 | Botros | |
| 5,849,833 A | 12/1998 | Puschak et al. | |
| 5,972,088 A | 10/1999 | Krishnan et al. | |
| 6,063,835 A | 5/2000 | Ohshima et al. | |
| 2002/0109309 A1 * | 8/2002 | Malanga et al. | 523/456 |

OTHER PUBLICATIONS

Lewis Sr, Richard J.; *Hawley's Condensed Chemical Dictionary*, 13$^{th}$ Ed. John Wiley and Sons, New York (p. 1005).

* cited by examiner

*Primary Examiner*—Callie Shosho
(74) *Attorney, Agent, or Firm*—Cassan Maclean

(57) ABSTRACT

Intaglio printing inks in paste form having both improved dispersibility and chemical resistance are provided and, in particular, dispersibility in tap water is provided in some formulations. The paste ink comprises an alkyd resin, having a degree of neutralization between about 10% and about 35% and an acid number between about 30 and 110, optionally containing an unsaturated oily component, an anionic or nonionic surfactant and an organic base selected from the group consisting of alcohol-amines, and substituted polyethyleneimines, wherein the substituted polyethyleneimines are modified with epichlorohydrine or alkoxylated and the organic base has a boiling point higher than 150° C. The ink may also comprise water.

14 Claims, No Drawings

INTAGLIO PRINTING INKS HAVING IMPROVED DISPERSIBILITY AND CHEMICAL RESISTANCE

CROSS-REFERENCE TO RELATED APPLICATION

This is a continuation-in-part application of application Ser. No. 09/455,762 filed Dec. 7, 1999 now abandoned.

FIELD OF THE INVENTION

The invention is in the field of paste intaglio printing inks for line-engraved plates, The inks of the invention have improved dispersibility and chemical resistance.

BACKGROUND

Line-engraved intaglio printing is typically used for printing security documents, such as banknotes, and uses printing cylinders having engravings therein in which intaglio printing inks have been deposited. Paste inks used in such printing are substantially different in nature from inks used in other forms of printing such as gravure, offset and ink-jet printing.

In line-engraved intaglio printing, the paste ink is applied to the printing cylinder so as to fill the engravings and then the excess ink on the cylinder (i.e., the ink which is outside of the engravings) is typically removed by a wiping cylinder which wipes off the excess ink. A diluted aqueous solution of sodium hydroxide, i.e. an alkaline (caustic) solution, is normally used by the wiping cylinder to emulsify and remove the excess ink. Therefore, in order to achieve effective wiping of the printing cylinders, it is important that the ink readily disperses in the wiping solution.

The poor dispersibility of known commercial paste inks in the alkaline washing solutions used in the cylinderwipe intaglio printing processes is often a problem and, to deal with this problem, attempts are often made to improve dispersibility by adding surfactants to the ink. However, the addition of surfactants usually results in a rapid loss of resistance to solvents and chemicals, particularly at higher surfactant concentrations, such as 2–10 weight %.

Disadvantageously, when using a caustic wiping solution, it is necessary to have ultrafiltration equipment to recover caustic values from the washing solution containing the suspended inks and extra chemicals, such as sodium or potassium hydroxide. Furthermore, sulfuric acid is needed to neutralize the used caustic solutions. By contrast, simple tap water would be ideal for use with the wiping cylinder because of the environmental advantages due to reduction in use of chemicals. However, the paste intaglio printing inks, which are generally used in the industry, do not disperse sufficiently in municipal water.

To print on a substrate using the line-engraved intaglio printing process, after the engravings have been inked and the excess ink removed, the printing cylinder is pressed against the substrate using a very high compression of about 10,000 N per centimetre of the cylinder's length. Once the printed matter is dry (typically after several days of oxidative curing) it is desirable that it remains steadfast on the substrate and resistant to leakage or smudging on coming into contact with solvents or chemicals such as alkaline solutions.

Accordingly, it is highly desirable that the properties of a paste intaglio printing ink include both good dispersibility and good chemical/solvent resistance and, in particular, that such dispersibility include dispersibility in water.

It is known in the art of making of inks and coatings that dispersibility can be improved by using alkyds with high acid numbers, but such components do not provide the desired dual properties of chemical resistance and water dispersibility.

In U.S. Pat. No. 4,764,215 it is claimed by Rudolph that drying oil soaps, prepared by high temperature saponification of unsaturated oils using metal hydroxides in the presence of triethanolamine, give inks with improved wipeability and resistance to water and eliminate volatile organic solvents However, as disclosed in U.S. Pat. No. 34,389 to Amon et, al., the ink compositions claimed by Rudolph are not satisfactory because they do not allow stable incorporation of even very low amounts of water, they do not sufficiently dry after printing and they are not resistant to the action of alkaline solutions.

It is also known in the art that the problems associated with an ink's lack of chemical resistance can be partly solved by the addition of components known to have high chemical resistance, such as dehydrated castor oil or epoxy esters of unsaturated fatty acids, but such additives usually result in significantly reduced dispersibility of the modified ink. Also, some such additives have poor solubility and require the use of a compatibilizing solvent, such as glycol ether. The addition of such low molecular weight compatibilizing materials (i.e. solvents) causes an increase in the total concentration of volatile organic solvents which introduces a formulation problem because some jurisdictions, for environmental reasons, restrict the allowable concentration of such solvents in printing inks.

Therefore, there is a serious need in the printing industry for a paste intaglio printing ink having improved solvent and chemical resistance as well as improved dispersibility, including tap water dispersibility, while, at the same time, avoiding the use of high concentrations of volatile organic components.

SUMMARY OF THE INVENTION

In accordance with the invention there is provided a paste intaglio printing ink comprising: an alkyd having a degree of neutralization within the range of about 10% to about 35%, preferably about 15% to 30%, an acid number in the range of about 30 to about 110, preferably about 60 to about 90, and being in the amount of about 15 to about 50 weight percentage; an anionic or nonionic surfactant in the amount of 0.5–12 weight percentage; and an organic multifunctional base in the amount of 0.5–5 weight percentage and selected from the group consisting of multifunctional alcoholamines, or substituted polyethyl-eneimines, wherein the substituted polyethyleneimines are modified with epichlorohydrine or alkoxylated and the base has a boiling point higher than 150° C. The intaglio ink normally also comprises pigment in the amount of 0–15 weight percentage, an extender in the amount of 25–70 weight percentage and a wax compound in the amount of 0–15 weight percentage. Optionally, the ink may include an unsaturated oily component in the amount of 5–15 weight percentage.

It is preferable that the surfactant has low molecular weight and that the molecular structure of the surfactant comprise bulky hydrophobic moieties.

The intaglio ink may also comprise water in an amount of up to about 15 weight percentage.

Also, in accordance with a further embodiment of the invention, there is provided a paste intaglio printing ink comprising a zwitterionic surfactant in the amount of 0.5–12 weight percentage and not separately including an organic base.

DETAILED DESCRIPTION OF THE PREFERRED EMBODIMENT

The paste intaglio printing inks of the present invention provide improved dispersibility and solvent/chemical resistance and can be formulated with relatively low concentrations of volatile organic components. Further, some of the improved inks claimed herein are subject to being water washable unlike the inks which are now known and used in the industry.

The improved alkyd-based inks of the invention comprise a surfactant and a multifunctional organic base. The organic base is used to partly neutralize the alkyd resin and to increase chemical resistance of the print. An unsaturated oily component as defined herein may also be included either as a separate component or as part of the alkyd itself (i.e. residual oily components remaining in the alkyd and resulting from the process or manner of preparation of the alkyd). Also, commercial alkyd products sometimes have added within them, by the manufacturer, a separate unsaturated oily component, which adjusts the "oil length" of the alkyd. Proper oil length of the alkyd vehicle is required to achieve the optimum dispersibility of the ink formulations claimed herein.

The term unsaturated oily component used herein means glycerides of unsaturated fatty acids (mostly di- and triglycerides) or a mixture of unsaturated fatty acids (such as tung oil). The standard processes for the manufacturing of alkyds, such as alcoholysis or acidolysis followed by polycondensation with poly-carboxylic acids, usually, but not necessarily, result in an oil length which must be adjusted by means of the addition of an "oily component".

The term "oil length" herein is defined as the amount of oil (or fatty acid expressed as triglyceride) present as a percentage of the total non-volatile content (see, for example, the reference P. Oldring and G. Hayward, Resins for Surface Coatings, Vol. 1, page 143, 1987 edition by SITA Technology, London, England). Tung oil or bodied tung oil, although they are mixtures of unsaturated fatty acids, are here considered to be oily components because they increase the "oil length" of the formulation.

Paste intaglio inks are usually prepared with alkyd resins left in their original, non-neutralized state, as neutralization of the alkyd resin could prevent it from bonding to the cellulose fibers in paper (bonding is considered to occur via formation of ester bonds with the free hydroxyl groups of the cellulose material). In experiments, where larger concentrations of the neutralizing base triethanolamine were used, corresponding to near-neutralization of the alkyd resin, the chemical resistance of the resulting formulations was, undesirably, strongly reduced, to the point of near-zero chemical resistance. According to the present invention, the paste ink contains a surfactant, preferably commercial, low molecular weight and of neutral pH (which generally cannot be neutralized any more), and an alkyd with a high acid number, i.e. between about 30 and 110. Addition of triethanolamine in sufficient amount, e.g. from about 1 wt % to about 2 wt %, desirably causes only partial neutralization of the alkyd resin, i.e. to between about 10% and 35% neutralization, more preferably between about 15% and 30% neutralization. Neutralization to levels above 35% causes undesirable loss of chemical resistance and, we note, a complete neutralization of the alkyd resin would cause complete loss of suitability of the formulation to perform as a paste printing ink.

A typical example (calculation) relating to neutralization of the alkyd is as follows:

In a formulation containing 35 wt % of alkyd resin with an acid number of 70 mg KOH/g, the concentration of triethanolamine necessary to neutralize this formulation would be 6.1 wt %. The paste inks of the invention for this example would instead use about from 1% to 2% of triethanolamine, which corresponds to neutralization of from about 16% to 32% of the free carboxylic groups of the alkyd resin. With a concentration of triethanolamine exceeding 5%, in this example, the chemical resistance of the resulting ink would be significantly reduced and the drying properties would disappear. A formulation containing 6.1% of triethanolamine in this example would have no chemical resistance and would not be suitable as a printing ink.

Although applicants do not wish to be held to any theory of the working of the invention, it appears that a synergistic result is obtained from the use of a multifunctional base, as prescribed herein, in combination with a surfactant and an alkyd, as prescribed herein, due to the resulting partial neutralization, in the range of about 10% to about 35%, of the alkyd by the base. The multifunctional base compensates with excess, the loss of chemical resistance normally associated with the use of a surfactant. In addition, the surfactant, due to improved penetration into the paper making fibers, provides an anchoring effect for the resin. The anchoring due to surfactants combined with binding and cross-linking effects from multi-functional bases provides a synergistic effect, which is the kit basis of this application.

It is noted that the teachings of the prior patent to Amon et al., mentioned above, are limited to use of a non-neutralized alkyd; discussion of neutralization is limited to the surfactant, which is neutralized prior to addition of non-neutralized alkyd. Use of a neutralized or partly neutralized alkyd was, prior to the present invention, counter-intuitive to one skilled in the art of paste intaglio inks in view of the negative impact on chemical dispersibility noted above.

The surfactant, for use with the paste ink of the invention, may be an anionic or nonionic surfactant or a combination of these. Examples of suitable surfactants include, but are not limited to, the following:

(1) Ethoxylated alkylphenols, such as those sold under the trademarks Triton X-100, Triton X-165, Triton X-305, Tergitol NP-8, Tergitol NP-9, Tergitol NP-10 by Union Carbide Corporation of Danbury, Conn., U.S.A.

(2) Phosphate esters of ethoxylated phenol derivatives, such as phosphate ester of tristyrylphenol, available under the trademark Soprophor 3D33 from Rhodia/Rhone-Poulenc, Inc., Cranbury, N.J., U.S.A.

(3) Alkylbenzene sulfonic acids and their salts, such those sold under the trademarks Witconate 1260 and Witconate 60T, mixtures comprising salts of dodecylbenzenesulfonate from Witco Corp., Greenwich, Conn., U.S.A (4) Alkyl(sulfophenoxy)benzene sulfonic acids derivatives, such those sold under the trademarks Dowfax C6L, Dowfax C10L, Dowfax 3B0, Dowfax 2EP, Dowfax 2A0 and Dowfax 8390, salts or acid forms of alkyl(sulfophenoxy) benzenesulfonic acids from Dow Chemical Co., Midland, Mich., U,S.A.

(5) Sulfonated Castor Oil, such as the product sold under the trademark FREEDOM SCO-70 by BF Goodrich Co., Charlotte, N.C., U.S.A.

(6) Diesters of succinic acid sulfonates, such as sodium dioctyl sulfosuccinate sold under the trademark Geropon SDS by Rhodia/Rhone-Poulenc, Inc., Cranbury, N.J., U.S.A.

(7) Ethoxylated sorbitan esters, such as ethoxylated sorbitan trioleate sold under the trademark Alkamuls PSTO-20 by Rhodia/Rhone-Poulenc, Inc., Cranbury, N.J., U.S.A.

(8) Phosphate esters of ethoxylated alcohols such as phosphate esters of ethoxylated tridecyl alcohol sold under the trademarks Rhodafac RS-710, Rhodafac RS-610 or Rhodafac RS-410, from Rhodia/Rhone-Poulenc, Inc., Cranbury, N.J., U.S.A, Use of a zwitterionic surfactant produces a less successful result in that dispersiblilty in alkaline wiping solutions is not achieved but, nevertheless both dispersibility in tap water and good chemical resistance is achieved. The use of a zwitterionic surfactant also avoids the need to add an organic base because such a surfactant contains a base as part of its own molecular structure. That is, in the case of a zwitterionic surfactant the base and surfactant are combined in a single molecule.

Cationic surfactants are not suitable for use because they do not demonstrate an improvement in dispersibility for the resulting inks.

The organic base may be comprised of one or more multifunctional organic base components, examples of which include, but are not limited to, the following;

(1) Ethanolamines, such as diethanolamine (DEA), triethanolamine (TEA), N-methyldiethanolamine (NMDEA), 2-(2-aminoethoxy)ethanol (sold under the trademark DIGLYCOLAMINE agent), and N,N-dimethyl-2-(2-aminoethoxy)ethanol (DMDGA), which are available from Huntsman Corp., Houston, Tex., U.S.A. (Some of these compounds are also available from Aldrich Co., Milwaukee, Wis.)

(2) Derivatives of polyethyleneimines, such as epichlorohydrin modified polyethyleneimine or 80% ethoxylated polyethyleneimine available from Sigma-Aldrich Co., Milwaukee, Wis., U.S.A.

The range of organic bases which are suitable for use in the invention are defined herein as organic amines selected from the group consisting of multifunctional alcohol-amines having more than two functional groups (preferably ethanolamines), and multifunctional amines, such as substituted polyethyleneimines, wherein the substituted polyethyleneimines are modified with epichlorohydrine or alkoxylated, and each of the organic amines of the group has a boiling point higher than 150° C.

The preferred concentration of the surfactant component of the ink is from 0.5 wt % to 12 wt % of the total ink, while the preferred concentration of the organic base is from 0.5 wt % to 5 wt % of the total ink. Most preferably, the concentration of the surfactant is from 2 wt % to 8 wt % and the concentration of the organic base is from 1 wt % to 4 wt % of the total ink. Although more than 5 wt % of organic base can be used, such an amount is usually detrimental to the chemical resistance of the print.

A paste intaglio printing ink formulated in accordance with the invention may comprise about 15–50 wt % alkyd having an acid number within the range of 30–110 (preferably between 60 and 90), about 0.5–12 wt % surfactant and about 0.5–5 wt % organic base. Preferably, about 5–15 wt % of an unsaturated oily component (for example, linseed, soya, tung oil or bodied tung oil) is added. Also normally included in intaglio inks are pigment(s) which may be dry or flush and may include phtalocyanines and/or other organic and inorganic pigments, an extender such as barium sulfate or calcium carbonate, and a wax compound such as natural waxes (Carnauba, Candelilla etc.), or synthetic waxes (polyethylene, polytetrafluoroethylene, paraffin, etc.).

The preferred driers are compounds of cobalt, manganese, calcium and zinc. The ink composition may also comprise oxidatively curing epoxy esters, preferably having a high acid number, or alkyds modified with polyurethanes. In addition, the composition may include rheology modifiers, such as that sold under the trademark Bentone SD1 (available from Rheox, Heightstown, N.J., U.S.A.), or oligomers of ethylene oxide, propylene oxide or their combination, such as those sold under the trademarks Carbowax PEG 200 and Carbowax PEG 600 (available from Union Carbide, Danbury, Conn., U.S.A.). The function of such rheology modifiers is to adjust viscosity, yield point, tack and the printing behaviour of the resultant ink.

In addition to the above-specified surfactant, the ink composition may also include a surfactant having strong penetrating properties, such as sodium dioctyl sulfosuccinate (for example, that sold under the trademark Geropon SDS which is available from Rhodia, Cranbury, N.J., U.S.A.). Optionally, the ink composition also preferably includes an anti-blocking agent, such as that sold under the trademark Ceramid which is available from Lonza, Fair Lawn, N.J., U.S.A.

One preferred paste ink composition in accordance with the invention is the following:

| Component | Weight % |
| --- | --- |
| modified vehicle* | 34.0 |
| pigment | 5.0 |
| calcium carbonate | 40.92 |
| wax | 9.0 |
| drier (6% Mn) | 0.29 |
| drier (10% Ca) | 0.29 |
| surfactant** | 7.0 |
| base*** | 3.5 |

*the modified vehicle being comprised of 80 wt % of the commercial vehicle/varnish sold under the trademark Hydrokyd-9 by Lawter International of Northbrook, Illinois, U.S.A. and 20 wt % of bodied tung oil (being the selected unsaturated oily component).
**the surfactant being sold under the trademark Rhodafac RS-610 (see the above description for greater detail).
***the base being triethanolamine.

Other preferred ink compositions may comprise water up to 15 wt %, consistent with maintaining the paste character of the ink. A paste intaglio ink typically has a viscosity in the range of from about 40 P to about 300 P. Viscosity at the yield point is from about 100,000 P to 40,000,000 P.

To prepare the above-noted preferred composition, the alkyd-based varnish and unsaturated oily component are mixed together. Then, the pigment and the extender (i.e. calcium carbonate) are stirred into the mixture and the resulting mixture is ground on a three-roll mill until the desired level of pigment dispersion is achieved. Then the wax, driers and the surfactant and organic base additives are stirred into the mixture and the resulting mixture is passed through the three-roll mill. The resulting ink is then mixed to achieve uniform composition and packaged into containers.

The results of comparative test samples of 25 paste ink compositions, designated as ink samples P1-P25 herein, are provided below, at the end of this description, under Tables 1, 2, 3 and 4 for the purpose of illustrating the properties of dispersibility and solvent/chemical resistance achieved by the present invention.

The ink samples P1–P25 were prepared by mixing varnish (Hydrokyd-9) with bodied tung oil, and then stirring-in the pigment with the extender. This mixture was then mixed manually until all of the solids were completely wetted by the varnish mixture. The wax compound was added to the resulting mixture and all large agglomerates were completely dispersed. Then the mixture was milled on a laboratory Muller (48 rotations) and the resulting ink samples were collected into closed vials for storage and testing. The specific formulation of each test sample is set out in Tables 1–4. In each case, 4 grams of the sample ink was prepared.

Table 1 illustrates the effect of different additives on the properties of paste ink. Table 2 illustrates the effect of using different organic bases on the paste ink properties and Table 1 illustrates the effect of different additives on the properties of ink. Table 2 illustrates the effect of using different organic bases on the ink properties and Table 3 illustrates the effect of using different surfactants, and water, on the paste ink properties. Table 4 illustrates the effect of using a zwitterionic surfactant (an amphoteric surfactant) on the paste ink properties.

The procedure used for the testing of the dispersibility of the paste ink samples was as follows. About 0.1 g of ink was collected on the end of a spatula and immersed in the tested solution (i.e. water or a caustic solution of specified concentration). The sample was kept still and separation of ink from the bulk of the sample was observed. The time from the start of immersion of the sample to the moment when a down-flowing streak of ink-water suspension was established was recorded as the dispersion time. As well, a qualitative evaluation of the amount of ink separated was made and the overall rating depended on both parameters.

The dispersibility ratings provided in the Tables are defined as follows:

E—time shorter than 5 seconds and large quantity of ink dispersion observed (excellent);

VG—time from 5 to 15 seconds and large quantity of ink dispersion observed (very good);

G—time from 15 to 30 seconds and large quantity of ink dispersion observed (good);

M—time from 20 to 40 seconds and moderate quantity of ink dispersion observed (moderate);

P—time from 30 to 45 seconds and small quantity of ink dispersion observed (poor);

VP—time from 45 to 60 seconds and small quantity of ink dispersion observed (very poor);

ND—time longer than 60 seconds (not dispersing).

The property of solvent and chemical resistance of the test samples is rated on a scale from 0 to 10 according to the following:

0—complete ink removal

1 & 2—very poor resistance

3 & 4—poor resistance

5—just failed

6—passed

7 & 8—good resistance

9 & 10—excellent resistance

The chemical resistance to alkaline solutions and to solvents was tested after storing the printed matter for seven days to allow for oxidative curing.

TABLE 1

Effects of additives on properties of paste inks

| | Unmod. ink P1 | Modif. ink P2 | Modif. ink P3 | Modif. ink P4 | Modif. ink P5 | Modif. ink P6 | Modif. ink P7 | Modif. ink P8 |
|---|---|---|---|---|---|---|---|---|
| COMPOSITIONS, WT. % | | | | | | | | |
| Vehicle Composition, wt. % | | | | | | | | |
| Hydrokyd-9 | 100 | 80 | 100 | 80 | 100 | 100 | 80 | 80 |
| Bodied tung oil | 0 | 20 | 0 | 20 | 0 | 0 | 20 | 20 |
| Ink Composition | | | | | | | | |
| Vehicle | 37.69 | 38.46 | 36.46 | 36.97 | 34.82 | 33.49 | 35.61 | 34.34 |
| Magiesol 40 | 2.11 | 0 | 1.63 | 0 | 1.95 | 1.88 | 0 | 0 |
| Pigment | 5.26 | 5.38 | 5.08 | 5.17 | 4.86 | 4.68 | 4.99 | 4.81 |
| Calcium carbonate | 44.41 | 45.38 | 42.63 | 43.63 | 41.04 | 39.47 | 42.01 | 40.52 |
| Wax | 9.91 | 10.12 | 9.80 | 9.74 | 9.16 | 8.81 | 9.38 | 9.04 |
| Mn drier, 6% active | 0.31 | 0.33 | 0.29 | 0.31 | 0.29 | 0.28 | 0.30 | 0.29 |
| Ca drier, 10% active | 0.31 | 0.33 | 0.29 | 0.31 | 0.29 | 0.28 | 0.30 | 0.29 |
| Accelerator Dri Rx-HF | 0 | 0 | 0 | 0 | 0.4 | 0.49 | 0 | 0 |
| Surf. (Rhodafac RS-610) | 0 | 0 | 0 | 0 | 7.19 | 7.11 | 7.41 | 7.14 |
| Base: triethanolamine | 0 | 0 | 3.82 | 3.87 | 0 | 3.51 | 0 | 3.57 |
| DISPERSIBILITY | | | | | | | | |
| Tap water | ND | ND | ND | ND | ND | M | VP | VG |
| Low Concentration of NaOH | | | | | | | | |
| 0.125% NaOH | ND | ND | ND | ND | VP | P | VP | G |
| 0.25% NaOH | ND | ND | ND | ND | G | G | E | E |
| 0.5% NaOH | ND | ND | ND | ND | VG | VG | E | E |
| High Conc. of NaOH | | | | | | | | |
| 1.0% NaOH | ND | ND | ND | ND | M | G | VG | VG |
| 1.5% NaOH | ND | ND | ND | ND | M | M | G | G |
| CHEMICAL RESISTANCE | | | | | | | | |
| (Tests on draw-downs) | | | | | | | | |
| Alkaline Solutions | | | | | | | | |
| 2% NaOH 30 min., 25° C. | 1 | 2 | 1 | 8 | 1 | 1 | 3 | 8 |
| 1% Na$_2$CO$_3$, 0.5% Persil, aq., 30 min., 80° C. | 1 | 1 | 1 | 6 | 0 | 0 | 1 | 8 |
| (Tests on printed proofs) | | | | | | | | |
| Acids and Bases | | | | | | | | |
| Hydrochloric Acid, 5%, 30 min., RT | 8 | 8 | 7 | 8 | 7 | 8 | 7 | 8 |
| 2% Sulfuric acid, 30 min., RT | 7 | 8 | 7 | 8 | 7 | 8 | 7 | 8 |
| Acetic Acid, 20%, 30 min., RT | 7 | 8 | 6 | 8 | 7 | 7 | 7 | 8 |
| NaOH, 2%, 30 min., RT | 0 | 5 | 1 | 7 | 0 | 0 | 6 | 7 |
| Bleach (Na hyp.), 5%, 30 min., RT | 7 | 7 | 8 | 8 | 8 | 7 | 8 | 7 |
| 1% Na$_2$CO$_3$, 0.5% Persil, 30 min., 80° C. | 1 | 4 | 1 | 7 | 1 | 1 | 7 | 8 |

TABLE 1-continued

Effects of additives on properties of paste inks

| | Unmod. ink P1 | Modif. ink P2 | Modif. ink P3 | Modif. ink P4 | Modif. ink P5 | Modif. ink P6 | Modif. ink P7 | Modif. ink P8 |
|---|---|---|---|---|---|---|---|---|
| Solvents/Laundry | | | | | | | | |
| Ethanol, 30 min., RT | 7 | 8 | 8 | 8 | 8 | 7 | 8 | 8 |
| Ethyl Acetate, 30 min., RT | 7 | 8 | 8 | 8 | 8 | 8 | 8 | 8 |
| Trichloroethylene, 30 min., RT | 8 | 8 | 7 | 8 | 8 | 8 | 8 | 8 |
| Xylene, 30 min., RT | 7 | 8 | 8 | 8 | 8 | 8 | 8 | 8 |
| Solvent Naptha, 30 min., RT | 7 | 7 | 8 | 8 | 8 | 8 | 8 | 8 |
| Perchloroethylene, 30 min., RT | 8 | 7 | 7 | 7 | 7 | 8 | 7 | 8 |
| Acetone, 5 min., | 8 | 8 | 8 | 8 | 7 | 8 | 8 | 7 |
| Synthetic perspiration, 10 min., 40° C. | 7 | 8 | 8 | 7 | 8 | 8 | 8 | 8 |
| Sunlight soap, 10%, 30 min., 80° C. | 4 | 4 | 3 | 8 | 3 | 3 | 7 | 7 |
| Laundry test | 8 | 9 | 8 | 9 | 7 | 9 | 9 | 9 |
| Physical Resistance Tests | | | | | | | | |
| IGT crumple test, 8 crumples | 9 | 9 | 9 | 9 | 9 | 9 | 9 | 9 |
| Rub test, 200 cycles | 9 | 9 | 9 | 9 | 9 | 9 | 9 | 9 |

TABLE 2

Effects of various bases on properties of paste inks.

| | Ink P9 | Ink P10 | Ink P11 | Ink P12 | Ink P13 | Ink P14 | Ink P15 |
|---|---|---|---|---|---|---|---|
| COMPOSITIONS, WT. % | | | | | | | |
| Vehicle Composition, wt. % | | | | | | | |
| Hydrokyd-9 | 80 | 80 | 80 | 80 | 80 | 80 | 80 |
| Bodied tung oil | 20 | 20 | 20 | 20 | 20 | 20 | 20 |
| Ink Composition | | | | | | | |
| Vehicle | 34.48 | 34.55 | 34.45 | 34.49 | 34.46 | 34.43 | 34.10 |
| Pigment | 4.75 | 4.76 | 4.74 | 4.75 | 4.75 | 4.74 | 4.76 |
| Calcium carbonate | 40.35 | 40.44 | 40.33 | 40.37 | 40.34 | 40.29 | 40.15 |
| Wax | 9.16 | 9.18 | 9.15 | 9.16 | 9.15 | 9.14 | 9.12 |
| Mn. drier, 6% active | 0.30 | 0.30 | 0.31 | 0.29 | 0.30 | 0.30 | 0.30 |
| Ca drier, 6% active | 0.30 | 0.30 | 0.31 | 0.31 | 0.30 | 0.31 | 0.30 |
| Accelerator, Dri RX-HF | 0.03 | 0.03 | 0.03 | 0.03 | 0.03 | 0.03 | 0.37 |
| Surf. (Rhodafac RS-610) | 7.08 | 6.96 | 7.12 | 7.07 | 7.07 | 7.17 | 7.16 |
| Organic base | 3.55 | 3.48 | 3.57 | 3.53 | 3.60 | 3.59 | 3.74 |
| Organic base formula | NMDEA | MEA | Morph. | PEI epl. | PEI linear | PEI mol. wt. 600 | PEI/ EO |
| DISPERSIBILITY | | | | | | | |
| Tap water | VG | VG | E | VP | VP | ND | VP |
| Low Concentration of NaOH | | | | | | | |
| 0.125% NaOH | G | G | VG | ND | ND | ND | ND |
| 0.25% NaOH | G | G | G | ND | M | VP | ND |
| 0.5% NaOH | G | G | G | G | E | E | E |
| High Concentration of NaOH | | | | | | | |
| 1.0% NaOH | G | G | VG | G | VG | VG | G |
| 1.5% NaOH | G | G | G | G | VG | G | G |
| CHEMICAL RESISTANCE (Tests on draw-downs) | | | | | | | |
| Alkaline Solutions | | | | | | | |
| 2% NaOH, 30 min., 25° C. | 8 | 4 | 1 | 7 | 3 | 4 | 7 |
| 1% $Na_2CO_3$, 0.5% Persil, aq., 30 min., 80° C. | 6 | 3 | 2 | 6 | 2 | 4 | 6 |

NMDEA - N-methyldiethanolamine; (Aldrich Co., Milwaukee, WI)
MEA - Monoethanolamine; (Aldrich Co., Milwaukee, WI)
Morph. - Morpholine; (Aldrich Co., Milwaukee, WI)
PEI epi. - Polyethyleneimine modified with epichlorohydrin, 17% aq. solution, molecular wt. 20,000; (Aldrich Co., Milwaukee, WI)

TABLE 2-continued

Effects of various bases on properties of paste inks.

|  | Ink P9 | Ink P10 | Ink P11 | Ink P12 | Ink P13 | Ink P14 | Ink P15 |
|---|---|---|---|---|---|---|---|

PEI linear - Linear polyethyleneimine aver. mol. wt. 423; (Aldrich Co., Milwaukee, WI)
PEI low m. wt. - Polyethyleneimine, mol. wt. 600, branched structure; (Aldrich Co., Milwaukee, WI)
PEI/EO - Polyethyleneimine, 80% ethoxylated, 37% aq. solution, mol. wt. 50,000; (Aldrich Co., Milwaukee, WI)
Composition of pigments: Carmine Red: 88.88 wt. %, Phtalocyanine Blue: 7.54 wt. %, Carbon Black: 3.58 wt. %. Wax: 87 wt. % Carnauba wax compound, 33 wt. % Candelilla wax compound.

TABLE 3

Effects of various surfactants and water on properties of paste inks.

|  | Ink P16 | Ink P17 | Ink P18 | Ink P19 | Ink P20 | Ink P21 | Ink P22 | Ink P23 |
|---|---|---|---|---|---|---|---|---|
| COMPOSITIONS, WT. % | | | | | | | | |
| Vehicle Composition, wt. % | | | | | | | | |
| Hydrokyd-9 | 80 | 80 | 80 | 80 | 80 | 80 | 80 | 80 |
| Bodied tung oil | 20 | 20 | 20 | 20 | 20 | 20 | 20 | 20 |
| Ink Composition | | | | | | | | |
| Vehicle | 35.41 | 34.24 | 35.61 | 34.34 | 35.84 | 34.34 | 32.83 | 32.86 |
| Pigment | 5.00 | 4.84 | 4.99 | 4.81 | 4.98 | 4.80 | 4.59 | 4.60 |
| Calcium carbonate | 41.65 | 40.26 | 42.02 | 40.52 | 41.96 | 40.43 | 38.66 | 38.69 |
| Wax | 9.29 | 8.98 | 9.37 | 9.04 | 9.53 | 9.18 | 8.78 | 8.78 |
| 6% Mn drier | 0.30 | 0.29 | 0.30 | 0.29 | 0.31 | 0.30 | 0.29 | 0.29 |
| 10% Ca drier | 0.30 | 0.29 | 0.30 | 0.29 | 0.31 | 0.30 | 0.29 | 0.29 |
| Accelerator Dri Rx-HF | 0.73 | 0.69 | 0 | 0 | 0 | 0 | 0 | 0 |
| Surfactant conc. | 7.32 | 6.94 | 7.41 | 7.14 | 7.27 | 7.00 | 6.76 | 6.68 |
| Surfactant name | Trit.-X | Trit.-X | Sopr. | Sopr. | T-11 | T-11 | RS-610 | Sopr. |
| Water | 0 | 0 | 0 | 0 | 0 | 0 | 4.26 | 4.42 |
| Base: triethanolamine | 0 | 3.47 | 0 | 3.57 | 0 | 3.65 | 3.54 | 3.39 |
| DISPERSIBILITY | | | | | | | | |
| Tap water | G | VG | M | G | ND | ND | E | E |
| Low Concentration of NaOH | | | | | | | | |
| 0.125% NaOH | G | G | ND | M | ND | ND | M | M |
| 0.25% NaOH | VG | E | G | VG | ND | ND | G | G |
| 0.5% NaOH | VG | VG | VG | VG | ND | ND | E | E |
| High Conc. of NaOH | | | | | | | | |
| 1.0% NaOH | G | G | G | G | ND | ND | VG | VG |
| 1.5% NaOH | M | P | M | M | ND | ND | G | G |
| CHEMICAL RESISTANCE (Tests on draw-downs) Alkaline Solutions | | | | | | | | |
| 2% NaOH, 30 min., 25° C. | 1 | 7 | 8 | 8 | 7 | 8 | 10 | 10 |
| 1% $Na_2CO_3$, 0.5% Persil, aq., 30 min., 80° C. | 1 | 5 | 3 | 9 | 2 | 3 | 10 | 10 |

Trit.-X - Triton-X 100 nonionic surfactant (Union Carbide, Danbury, CT)
Sopr. - Soprophor 3D33, anionic surfactant (Rhodia, Cranbury, NJ)
T-11 - Chemzoline T-11, cationic surfactant (Chemron Corp., Paso Robies, CA),
RS-610 - Rhodafac RS-610, anionic surfactant (Rhodia, Cranbury, NJ)

TABLE 4

Effects of amphoteric surfactant on properties of paste inks.

|  | Ink P24 | Ink P25 |
|---|---|---|
| COMPOSITIONS, WT. % | | |
| Vehicle Composition, wt. % | | |
| Hydrokyd-9 | 80 | 80 |
| Bodied lung oil | 20 | 20 |
| Ink Composition | | |
| Vehicle | 35.72 | 34.41 |
| Pigment | 4.90 | 4.72 |
| Calcium carbonate | 41.83 | 40.29 |
| Wax | 9.45 | 9.10 |
| Mn drier, 6% active | 0.28 | 0.27 |

TABLE 4-continued

Effects of amphoteric surfactant on properties of paste inks.

|  | Ink P24 | Ink P25 |
|---|---|---|
| Ca drier, 10% active | 0.35 | 0.34 |
| Accelerator Dri RX-HF | 0.00 | 0.00 |
| Surfactant conc. | 7.47 | 7.31 |
| Surfactant name | Mirat. JC-HA | Mirat. JC-HA |
| Base: triethanolamine | 0 | 3.56 |
| DISPERSIBILITY | | |
| Tap water | | |
| Low Concentration of NaOH | | |
| 0.125% NaOH | P | VP |
| 0.25% NaOH | VP | VP |
| 0.5% NaOH | VP | ND |
| High Conc. of NaOH | | |
| 1.0% NaOH | VP | ND |
| 1.5% NaOH | VP | ND |
| CHEMICAL RESISTANCE | | |
| Alkaline Solutions | | |
| 2% NaOH, 30 min., 25° C. | 8 | 6 |
| 1% Na$_2$CO$_3$, 0.5% Persil, aq., 30 min., 80° C. | 7 | 4 |

Mirat. JC-HA - Mirataine JC-HA, aminopropionate, amphoteric surfactant, (Rhodia, Cranbury, NJ)

In Table 1 ink sample P1, being a conventional alkyd-based paste intaglio ink without the addition of surfactant, organic base and drying tung oil, is shown to be non-dispersible in water or any alkaline solution having up to 1.5 wt % of NaOH. This ink sample also demonstrated very low alkaline and soap resistance. Ink sample P2 includes bodied tung oil over the conventional formulation of sample P1. The test results provided by sample P2 demonstrated only marginal improvement for alkaline resistance and no improvement for dispersibility. The test results for ink samples P3 and P4, which include organic base but not surfactant, show that the base alone or even in combination with bodied tung oil (as in sample P4) have no effect on dispersibility of the ink. However, ink sample P4 generally demonstrated higher chemical resistance than ink sample P3, indicating that the combination of bodied tung oil with an organic base produces a favourable effect on chemical resistance.

For ink sample P5 a surfactant (in the amount of 7.19 wt %) was added but without the addition of an organic base or drying oil and the results show no improvement for chemical resistance but some, limited improvement for dispersibility, in that the ink was shown to be dispersible in some alkaline solutions. Ink sample P6 comprised the combination of a surfactant with an organic base but without bodied tung oil and, as shown in Table 1, the results showed only limited improvement over the conventional ink formulation and the desired chemical resistance was not gained, while water dispersibility was very limited. Similarly, for sample P7, comprising a combination of surfactant with bodied tung oil, but without an organic base, the test results show only a marginal, unsatisfactory level of improvement in the chemical resistance of the ink and an improvement in dispersibility.

The test results of ink sample P8, which includes each of the components—a surfactant, organic base and an unsaturated oily component (bodied tung oil), shows that proper combination of surfactant with a base (with optimized oil length) provides the desired results, namely, superior properties both in dispersibility and in chemical resistance. Solvent resistance, crumple resistance and rub resistance of the sample ink (P8) having the specified components are very good, as shown in Table 1.

Table 2 illustrates the effect of various bases on the properties of the ink samples. The test results identify that the molecular structure of the base selected for use has a strong effect on the chemical resistance of the ink produced therefrom.

For example, ink sample P11, in which the organic base comprised an unsubstituted morpholine, did not provide an acceptable level of chemical resistance and the results produced by it were inferior to the results produced by ink sample P8 (see Table 1) in which triethanolamine was used. Similarly, in sample P10, the use of monoethanolamine did not achieve acceptable chemical resistance. However, in ink sample P9, the use of N-methyldiethanolamine produced good results. For ink samples P12, P13, P14 and P15, polyethyleneimine and derivatives thereof were used as the organic base and, as shown by Table 2, the results of the ink samples comprising an unsubstituted polyethyleneimine produced unacceptable results. However, the results of ink samples P12 and P15, comprising polyethyleneimine modified with epichlorohydrin and ethoxylated polyethyleneimine, respectively, showed acceptable chemical resistance and good dispersibility for the higher concentration alkaline solutions.

Table 3 illustrates, on a comparison basis, the effect of using various surfactants on the properties of the inks. The test results indicate that ink samples P19, P22 and P23 (see Table 3)and P8 (see Table 1) provided the best results with each of these showing both good chemical resistance and good dispersibility. The surfactants used for these ink samples, Rhodafac RS-610 and Soprophor 3D33, are low molecular weight surfactants and their molecular structures have bulky hydrophobic moieties which is a preferred characteristic for the surfactant to be selected for use in the formulations. The surfactant of ink samples P8 and P22, Rhodafac RS-610, is a phosphate ester of branched alcohol ethoxylate and, as such, it has a bulky hydrophobic part, and the surfactant of ink samples P19 and P23, Soprophor 3D33, is a phosphate ester of tristyrylphenol ethoxylate, which has an extremely bulky hydrophobic part. By contrast, the low molecular weight surfactant of sample P17, Triton X-100, which is an ethoxylate of octylphenol with an average number of ethylene oxide units equal to 9.5, does not have a bulky hydrophobic moiety and as such is not as effective in improving the desired properties of inks. The term "low molecular weight" with reference to the surfactant is used herein to mean surface active compounds with molecular weights below 5000 units, preferably below 2000 units, most preferably between 200 units and 1500 units of atomic mass, respectively.

The results of Table 3 also demonstrate the importance of the ionic form of the surfactant to be selected for use. Anionic as surfactants (e.g. Rhodafac RS-610 and Soprophor 3D33) and nonionic surfactants (Triton X-100) were shown to be effective to improve the properties of the ink, but a cationic surfactant (e.g. Chemzoline T-11, alkyl aminoethyl imidazoline) was shown, by ink samples P20 and P21, to be completely ineffective for use as an agent to improve the dispersibility of the inks.

Table 3 also illustrates, by comparative sample inks P16 and P17 and inks P18 and P19, that the addition of an organic base (in these cases triethanolamine) resulted in improvements of both dispersibility and chemical resistance.

For ink samples P20 and P21, comprising a cationic surfactant, the test results demonstrated that they produced improved chemical resistance over the ink samples P1 and P2 but their dispersibility was unacceptable. In addition, since cationic surfactants are themselves bases, the addition of a base such as triethanolamine (see sample P21) provided only slight improvement in the chemical resistance of the sample.

The test results shown in Table 3 identify that still greater improvement in chemical resistance and in dispersibility may be achieved by adding about 4 wt. % of water to the ink composition. The sample inks P22 and P23 contained water accordingly, and demonstrated excellent water and alkaline dispersibility.

Table 4 illustrates the effect of a zwitterionic surfactant, with and without the addition of an organic base, on the properties of the ink sample. As shown, the addition of this surfactant plus an organic base (triethanolamine) did not achieve the desired properties. This is because the zwitterionic surfactant, aminopropionate sold under the trademark Mirataine JC-HA, comprises an integral functional amino group and, therefore, the addition of a free base (triethanolamine), per ink sample P25, provided an excess of the amine functionality and resulted in lower chemical resistance.

However, the results of ink sample P24, which did not include the addition of a separate organic base component, show that the use of a zwitterionic surfactant provides significant success in that both dispersibility in tap water and good chemical resistance are achieved by using this surfactant. The test results for this ink sample further show that this ink did not provide acceptable dispersibility in alkaline solutions.

It is hypothesized, in relation to the embodiments of the invention that involve use of multi-functional alcoholamines, that the mechanism responsible for the increase in chemical resistance of the prints is related to two kinds of reactions:

reactions of multifunctional alcoholamine with the alkyd resin, where the alcoholamine reacts with the carboxylic groups of the alkyd resin and slowly forms amide bonds with the resin molecules; and reaction of the alcoholamine with certain active centers (scission/decomposition areas) of the cellulose fibers via highly reactive amine groups.

The first group of alcoholamine molecules cause slow but strong crosslinking of the resin, because there are still several free hydroxyl groups in the molecule. The second group of the molecules binds multiple molecules of the resin, or several centers of a single alkyd molecule, to single anchoring points on the cellulose fibers. The combination of the crosslinking and binding effects causes the chemical resistance of the print to be significantly increased. Since the alkyds are based on mixtures of many homologs of carboxylic acids and since multiple functional groups are involved, the reactions are very complex and difficult to investigate or to present in standard chemical notation.

The above hypothesis is supported by the fact that the effectiveness of alkanolamines in increasing of chemical resistance was in the same order as their functionality:

TABLE 5

| Alkanolamine | | |
| --- | --- | --- |
| Triethanolamine | Diethanolamine deriv. (NMDEA) | Monoethanolamine |
| Number of functional groups | | |
| 4 | 3 | 2 |
| Chemical resistance of prints (2% NaOH, 25° C., 30 min.) | | |
| 10 (Examples P22 and P23) | 8 (Example P9) | 4 (Example P10) |

Examples from Tables 2 and 3 (P22, P23, P9 and P10, quoted in Table 5 above) provide experimental evidence for the hypothesis that the chemical resistance is related to the crosslinking capacity of the alkanolamines.

It will be appreciated by those skilled in the art that changes could be made to the specific examples of embodiments of the invention which are described herein without departing from the scope of the invention which has been made and is claimed by the applicants. It is to be understood, therefore, that the invention claimed by the applicants is defined by the appended claims and is not limited to any of the examples or modifications thereof which are described herein.

What is claimed is:

1. A paste intaglio printing ink comprising:

(1) an alkyd resin having a degree of neutralization within the range of about 10% to about 35%, an acid number in the range of about 30 to about 110, and being in the amount of about 15 to about 50 weight percentage;

(2) an anionic or nonionic surfactant in the amount of 0.5–12 weight percentage, wherein the molecular structure of said surfactant comprises bulky hydrophobic moieties; and (3) an organic base, in the amount of 0.5–5 weight percentage, selected from the group consisting of multi-functional alcohol-amines, ring-containing nitrogen compounds and substituted polyethyleneimines, wherein said substituted polyethyleneimines are modified with epichlorohydrine or alkoxylated, and said base has a boiling point higher than 150° C.

2. An intaglio printing ink according to claim 1, further comprising an unsaturated oily component in the amount of 5–15 weight percentage.

3. An intaglio ink according to claim 2, further comprising pigment in the amount of 0–5 weight percentage, an extender in the amount of 25–70 weight percentage and wax compound in the amount of 0–15 weight percentage.

4. An intaglio ink according to claim 3 wherein said surfactant has low molecular weight.

5. An intaglio ink according to claim 3, wherein the alkyd resin has a degree of neutralization between about 15% and 30%.

6. An intaglio ink according to claim 2 wherein said surfactant has low molecular weight.

7. An intaglio ink according to claim 6 and further comprising water in an amount of 0–15 weight percentage.

8. An intaglio ink according to claim 2, wherein the alkyd resin has a degree of neutralization between about 15% and 30%.

9. An intaglio ink according to claim 1 wherein said surfactant has low molecular weight.

10. An intaglio ink according to claim 9, further comprising water in an amount of 0–15 weight percentage.

11. An intaglio ink according to claim 1, wherein the alkyd resin has a degree of neutralization between about 15% and 30%.

12. An intaglio printing ink according to claim 1, wherein said surfactant is selected from the group consisting of phosphate esters of ethoxylated phenol derivatives and phosphate esters of ethoxylated alcohols.

13. An intaglio printing ink according to claim 12, wherein said surfactant is a phosphate ester of tristyrylphenol.

14. An intaglio printing ink according to claim 12, wherein said surfactant is a phosphate ester of ethoxylated tridecyl alcohol.

* * * * *